US010430002B2

(12) United States Patent
Huang et al.

(10) Patent No.: US 10,430,002 B2
(45) Date of Patent: Oct. 1, 2019

(54) TOUCHSCREEN INPUT METHOD AND TERMINAL

(71) Applicant: Huawei Technologies Co., Ltd., Shenzhen (CN)

(72) Inventors: Hai Huang, Shanghai (CN); Liang Xie, Shenzhen (CN); Honglei Luo, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 73 days.

(21) Appl. No.: 15/522,935

(22) PCT Filed: Mar. 31, 2015

(86) PCT No.: PCT/CN2015/075488
§ 371 (c)(1),
(2) Date: Apr. 28, 2017

(87) PCT Pub. No.: WO2016/154889
PCT Pub. Date: Oct. 6, 2016

(65) Prior Publication Data
US 2017/0329435 A1 Nov. 16, 2017

(51) Int. Cl.
G06F 3/044 (2006.01)
G06F 1/3203 (2019.01)
(Continued)

(52) U.S. Cl.
CPC .......... *G06F 3/044* (2013.01); *G06F 1/3203* (2013.01); *G06F 1/3262* (2013.01); *G06F 3/012* (2013.01);
(Continued)

(58) Field of Classification Search
CPC .... G06F 3/044; G06F 3/04886; G06F 3/0484; G06F 3/0418; G06F 1/3262; G06F 1/3203; G06F 3/0416; G06F 3/012; G06F 3/0488
See application file for complete search history.

(56) References Cited

U.S. PATENT DOCUMENTS

2011/0285645 A1* 11/2011 Cho ...................... G06F 3/0416
345/173
2012/0071149 A1* 3/2012 Bandyopadhyay ... G06F 1/1643
455/418
(Continued)

FOREIGN PATENT DOCUMENTS

CN 101021762 A 8/2007
CN 103064548 A 4/2013
(Continued)

OTHER PUBLICATIONS

Foreign Communication From A Counterpart Application, Korean Application No. 10-2017-7012268, Korean Office Action dated May 18, 2018, 5 pages.
(Continued)

Primary Examiner — Abhishek Sarma
(74) Attorney, Agent, or Firm — Conley Rose, P.C.

(57) ABSTRACT

A touchscreen input method and a terminal are provided. The method includes, when a signal for waking up a touchscreen is received, obtaining on the touchscreen an effective touch area that corresponds to the signal for waking up the touchscreen according to a preset correspondence between the signal for waking up the touchscreen and the effective touch area. The method also includes detecting position information of a touch point within the effective touch area and generating an operation instruction according to the position information of the touch point. The embodiments of the present invention also disclose a terminal. The
(Continued)

terminal can accurately obtain a touch point in a preset touch area when the terminal is being woken up.

22 Claims, 4 Drawing Sheets

(51) Int. Cl.
 *G06F 3/01*  (2006.01)
 *G06F 3/041*  (2006.01)
 *G06F 3/0488*  (2013.01)
 *G06F 1/3234*  (2019.01)
 *G06F 3/0484*  (2013.01)

(52) U.S. Cl.
 CPC .......... *G06F 3/0416* (2013.01); *G06F 3/0418* (2013.01); *G06F 3/0484* (2013.01); *G06F 3/0488* (2013.01); *G06F 3/04886* (2013.01)

(56) References Cited

U.S. PATENT DOCUMENTS

| | | | |
|---|---|---|---|
| 2012/0105481 A1 | 5/2012 | Baek et al. | |
| 2013/0222286 A1* | 8/2013 | Kang | G06F 3/041 345/173 |
| 2014/0049494 A1* | 2/2014 | Niu | G06F 3/0488 345/173 |
| 2015/0362959 A1* | 12/2015 | Popescu | G06F 3/0488 345/173 |
| 2016/0154526 A1 | 6/2016 | Hao et al. | |

FOREIGN PATENT DOCUMENTS

| | | |
|---|---|---|
| CN | 104345947 A | 2/2015 |
| CN | 104423656 A | 3/2015 |
| KR | 20120047753 A | 5/2012 |

OTHER PUBLICATIONS

Foreign Communication From A Counterpart Application, Korean Application No. 10-2017-7012268, English Translation of Korean Office Action dated May 18, 2018, 3 pages.
Machine Translation and Abstract of Chinese Publication No. CN101021762, Aug. 22, 2007, 5 pages.
Machine Translation and Abstract of Chinese Publication No. CN104345947, Feb. 11, 2015, 11 pages.
Foreign Communication From A Counterpart Application, PCT Application No. PCT/CN2015/075488, English Translation of International Search Report dated Jan. 4, 2016, 2 pages.
Machine Translation and Abstract of Chinese Publication No. CN103064548, Apr. 24, 2013, 21 pages.
Foreign Communication From A Counterpart Application, Chinese Application No. 201580078024.1, Chinese Office Action dated Mar. 4, 2019, 7 pages.
Samsung GT-19300 Standby and call reception screen: Standby screen and Receiving call screen of Samsung Galaxy S3 model released before the filing date Jun. 30, 2012, 1 page.
Foreign Communication From A Counterpart Application, Korean Application No. 10-2017-7012268, Korean Office Action dated Nov. 11, 2018, 4 pages.
Foreign Communication From A Counterpart Application, Korean Application No. 10-2017-7012268, English Translation of Korean Office Action dated Nov. 27, 2018, 4 pages.

\* cited by examiner

TOUCHSCREEN INPUT METHOD AND TERMINAL

CROSS-REFERENCE TO RELATED APPLICATIONS

This application is a national stage application of International Patent Application No. PCT/CN2015/075488, filed on Mar. 31, 2015, which is herein incorporated by reference in its entirety.

TECHNICAL FIELD

The disclosure relates to the field of electronic technologies, and in particular, to a touchscreen input method and a terminal.

BACKGROUND

With development of intelligent terminal technologies, intelligent terminals with touchscreen technologies are the mainstream of the current market, and a user can operate an intelligent terminal only by operating on a touchscreen, thereby greatly improving convenience and experience of user operations.

Currently, a touchscreen is generally a capacitive touch panel (CTP) and is applicable to multi-touch, that is, a touchscreen can identify touch points simultaneously touched by different conductors on the touchscreen.

However, although a touchscreen is applicable to multi-touch, there is an upper limit to touch points that can be identified by the touchscreen. For example, a touchscreen can simultaneously identify only touch points of three different conductors, for example, touch points simultaneously touched by three fingers on the screen. However, when a CTP reference signal value (i.e., Baseline) is abnormal or suffers radio frequency interference, for example, a touchscreen of a mobile phone is in contact with a thigh when the mobile phone receives a call waking up signal, during self-calibration of the mobile phone, the mobile phone considers a state in which the touchscreen is in contact with the thigh (that is, there is a conductor) as a normal state, and a state in which the touchscreen is not in contact with the thigh (that is, there is no conductor) as a state in which a touch point is touched all the time. That is, after the touchscreen is woken up and the reference signal value is abnormal, when the touchscreen is moved away from the thigh, the touchscreen may determine that multiple different conductors touch the touchscreen currently, and a quantity of the conductors exceeds an upper limit that can be detected by the touchscreen. Therefore, when a user operates a terminal to answer a call or refuse a call, the terminal does not obtain a touch point that is touched by the user on a touchscreen. As a result, the touchscreen is invalid when being woken up, the user cannot perform a touch operation on the screen, that is, a screen freezing phenomenon occurs, and user experience is poor.

SUMMARY

To resolve the foregoing technical problems, embodiments of the disclosure provide a touchscreen input method and a terminal, so that a terminal can accurately obtain a touch point in a preset touch area, thereby improving accuracy during an operation of the terminal, reducing screen freezing phenomena when the terminal is being woken up, and improving user experience.

A first aspect of the disclosure provides a touchscreen input method, where the method includes, when a signal for waking up a touchscreen is received, obtaining on the touchscreen an effective touch area that corresponds to the signal for waking up the touchscreen according to a preset correspondence between the signal for waking up the touchscreen and the effective touch area; detecting position information of a touch point within the effective touch area; and generating an operation instruction according to the position information of the touch point.

In a first possible implementation manner, detecting the position information of a touch point within the effective touch area includes obtaining position information of a touch point on the touchscreen; determining whether the position information of the touch point is within the effective touch area; and when the position information of the touch point is within the effective touch area, obtaining the position information of the touch point; or when the position information of the touch point is outside the effective touch area, suppressing the position information of the touch point.

With reference to the first possible implementation manner of the first aspect, in a second possible implementation manner, detecting the position information of a touch point within the effective touch area includes obtaining position information of a touch point on the touchscreen by using a CTP module; reporting the position information of the touch point to a CTP thread by using the CTP module; determining, by using the CTP thread, whether the position information of the touch point is within the effective touch area; and when it is determined, by using the CTP thread, that the position information of the touch point is within the effective touch area, obtaining, by using the CTP thread, the position information of the touch point for processing; or when it is determined, by using the CTP thread, that the position information of the touch point is outside the effective touch area, performing no processing on the position information of the touch point by using the CTP thread.

With reference to the first possible implementation manner of the first aspect, in a third possible implementation manner, detecting the position information of a touch point within the effective touch area includes obtaining position information of a touch point on the touchscreen by using the CTP module; determining, by using the CTP module, whether the position information of the touch point is within the effective touch area; and when it is determined, by using the CTP module, that the position information of the touch point is within the effective touch area, reporting, by using the CTP module, the position information of the touch point to the CTP thread for processing; or when it is determined, by using the CTP module, that the position information of the touch point is outside the effective touch area, skipping reporting the position information of the touch point to the CTP thread for processing.

With reference to the first aspect, or the first possible implementation manner of the first aspect, or the second possible implementation manner of the first aspect, or the third possible implementation manner of the first aspect, in a fourth possible implementation manner, the signal for waking up the touchscreen includes any one or more of a call waking up signal, a short message service message waking up signal, or a waking up signal generated by triggering a key.

With reference to the fourth possible implementation manner of the first aspect, in a fifth possible implementation manner, when a signal for waking up a touchscreen is received, obtaining, on the touchscreen, an effective touch area that corresponds to the signal for waking up the touchscreen according to a preset correspondence between the signal for waking up the touchscreen and the effective touch area. When the received signal for waking up the touchscreen includes the call waking up signal, the effective touch area that corresponds to the call waking up signal that is obtained on the touchscreen includes an operation touch area on a call interface.

With reference to the fourth possible implementation manner of the first aspect, in a sixth possible implementation manner, when a signal for waking up a touchscreen is received, obtaining, on the touchscreen, an effective touch area that corresponds to the signal for waking up the touchscreen according to a preset correspondence between the signal for waking up the touchscreen and the effective touch area, when the received signal for waking up the touchscreen includes the short message service message waking up signal, the effective touch area that corresponds to the short message service message waking up signal that is obtained on the touchscreen includes an operation touch area on a short message service message interface.

With reference to the fourth possible implementation manner of the first aspect, in a seventh possible implementation manner, when a signal for waking up a touchscreen is received, obtaining, on the touchscreen, an effective touch area that corresponds to the signal for waking up the touchscreen according to a preset correspondence between the signal for waking up the touchscreen and the effective touch area. When the received signal for waking up the touchscreen includes the waking up signal generated by triggering a key, the effective touch area that corresponds to the waking up signal generated by triggering the key that is obtained on the touchscreen includes an operation touch area on an interface generated by triggering the key.

A second aspect of the disclosure provides a terminal, including an obtaining unit configured to, when a signal for waking up a touchscreen is received, obtain on the touchscreen an effective touch area that corresponds to the signal for waking up the touchscreen according to a preset correspondence between the signal for waking up the touchscreen and the effective touch area; a detection unit configured to detect position information of a touch point within the effective touch area; and an instruction generation unit configured to generate an operation instruction according to the position information of the touch point.

In a first possible implementation manner, the detection unit includes a first obtaining subunit configured to obtain position information of a touch point on the touchscreen; a first determining subunit configured to determine whether the position information of the touch point is within the effective touch area; a second obtaining subunit configured to, when the first determining subunit determines that the position information of the touch point is within the effective touch area, obtain the position information of the touch point; and a first suppressing subunit configured to, when the first determining subunit determines that the position information of the touch point is outside the effective touch area, suppress the position information of the touch point.

With reference to the first possible implementation manner of the second aspect, in a second possible implementation manner, the detection unit includes a third obtaining subunit configured to obtain position information of a touch point on the touchscreen by using a CTP module; a first reporting subunit configured to report the position information of the touch point to a CTP thread by using the CTP module; a second determining subunit configured to determine, by using the CTP thread, whether the position information of the touch point is within the effective touch area; a fourth obtaining subunit configured to, when the second determining subunit determines that the position information of the touch point is within the effective touch area, obtain by using the CTP thread the position information of the touch point for processing; and a second suppressing subunit configured to, when the second determining subunit determines that the position information of the touch point is outside the effective touch area, suppress the position information of the touch point.

With reference to the first possible implementation manner of the second aspect, in a third possible implementation manner, the detection unit includes a fifth obtaining subunit configured to obtain position information of a touch point on the touchscreen by using the CTP module; a third determining subunit configured to determine, by using the CTP module, whether the position information of the touch point is within the effective touch area; a second reporting subunit configured to, when the third determining subunit determines that the position information of the touch point is within the effective touch area, report by using the CTP module the position information of the touch point to the CTP thread for processing; and a third suppressing subunit configured to, when the third determining subunit determines that the position information of the touch point is outside the effective touch area, skip reporting the position information of the touch point to the CTP thread for processing.

With reference to the second aspect, or the first possible implementation manner of the second aspect, or the second possible implementation manner of the second aspect, or the third possible implementation manner of the second aspect, in a fourth possible implementation manner, the signal for waking up the touchscreen includes any one or more of a call waking up signal, a short message service message waking up signal, or a waking up signal generated by triggering a key.

With reference to the fourth possible implementation manner of the second aspect, in a fifth possible implementation manner, the obtaining unit is configured to, when the received signal for waking up the touchscreen includes the call waking up signal, obtain the effective touch area that corresponds to the call waking up signal that is obtained on the touchscreen. The effective touch area includes an operation touch area on a call interface.

With reference to the fourth possible implementation manner of the second aspect, in a sixth possible implementation manner, the obtaining unit is configured to, when the received signal for waking up the touchscreen includes the short message service message waking up signal, obtain the effective touch area that corresponds to the short message service message waking up signal that is obtained on the touchscreen. The effective touch area includes an operation touch area on a short message service message interface.

With reference to the fourth possible implementation manner of the second aspect, in a seventh possible implementation manner, the obtaining unit is configured to, when the received signal for waking up the touchscreen includes the waking up signal generated by triggering a key, obtain the effective touch area that corresponds to the waking up signal generated by triggering the key that is obtained on the touchscreen. The effective touch area includes an operation touch area on an interface generated by triggering the key.

A third aspect of the disclosure provides a computer storage medium, where the computer storage medium stores a program, and when the program is executed, the foregoing steps are performed.

A fourth aspect of the disclosure provides a terminal, including an input apparatus, a memory, and a processor, where the memory stores a set of program code, and the processor is configured to invoke the program code stored in the memory to perform the following operations: when the input apparatus receives a signal for waking up a touchscreen, obtaining, on the touchscreen, an effective touch area that corresponds to the signal for waking up the touchscreen according to a preset correspondence between the signal for waking up the touchscreen and the effective touch area; detecting position information of a touch point within the effective touch area; and generating an operation instruction according to the position information of the touch point.

In a first possible implementation manner, detecting, by the processor, position information of a touch point within the effective touch area includes obtaining position information of a touch point on the touchscreen; determining whether the position information of the touch point is within the effective touch area; and when the position information of the touch point is within the effective touch area, obtaining the position information of the touch point; or when the position information of the touch point is outside the effective touch area, suppressing the position information of the touch point.

With reference to the fourth aspect or the first possible implementation manner of the fourth aspect, in a second possible implementation manner, detecting, by the processor, position information of a touch point within the effective touch area includes obtaining position information of a touch point on the touchscreen by using a CTP module; reporting the position information of the touch point to a CTP thread by using the CTP module; determining, by using the CTP thread, whether the position information of the touch point is within the effective touch area; and when it is determined, by using the CTP thread, that the position information of the touch point is within the effective touch area, obtaining, by using the CTP thread, the position information of the touch point for processing; or when it is determined, by using the CTP thread, that the position information of the touch point is outside the effective touch area, performing no processing on the position information of the touch point by using the CTP thread.

With reference to the first possible implementation manner of the fourth aspect, in a third possible implementation manner, detecting, by the processor, position information of a touch point within the effective touch area includes obtaining position information of a touch point on the touchscreen by using the CTP module; determining, by using the CTP module, whether the position information of the touch point is within the effective touch area; and when it is determined, by using the CTP module, that the position information of the touch point is within the effective touch area, reporting, by using the CTP module, the position information of the touch point to the CTP thread for processing; or when it is determined, by using the CTP module, that the position information of the touch point is outside the effective touch area, skipping reporting the position information of the touch point to the CTP thread for processing.

With reference to the fourth aspect, or the first possible implementation manner of the fourth aspect, or the second possible implementation manner of the fourth aspect, or the third possible implementation manner of the fourth aspect, in a fourth possible implementation manner, the signal for waking up the touchscreen includes any one or more of a call waking up signal, a short message service message waking up signal, or a waking up signal generated by triggering a key.

With reference to the fourth possible implementation manner of the fourth aspect, in a fifth possible implementation manner, the processor is configured to, when the input apparatus receives a signal for waking up a touchscreen, obtain on the touchscreen an effective touch area that corresponds to the signal for waking up the touchscreen according to a preset correspondence between the signal for waking up the touchscreen and the effective touch area. When the received signal for waking up the touchscreen includes the call waking up signal, the effective touch area that corresponds to the call waking up signal and that is obtained on the touchscreen includes an operation touch area on a call interface.

With reference to the fourth possible implementation manner of the fourth aspect, in a sixth possible implementation manner, the processor is configured to, when the input apparatus receives a signal for waking up a touchscreen, obtain on the touchscreen an effective touch area that corresponds to the signal for waking up the touchscreen according to a preset correspondence between the signal for waking up the touchscreen and the effective touch area. When the received signal for waking up the touchscreen includes the short message service message waking up signal, the effective touch area that corresponds to the short message service message waking up signal and that is obtained on the touchscreen includes an operation touch area on a short message service message interface.

With reference to the fourth possible implementation manner of the fourth aspect, in a seventh possible implementation manner, the processor is configured to, when the input apparatus receives a signal for waking up a touchscreen, obtain on the touchscreen an effective touch area that corresponds to the signal for waking up the touchscreen according to a preset correspondence between the signal for waking up the touchscreen and the effective touch area. When the received signal for waking up the touchscreen includes the waking up signal generated by triggering a key, the effective touch area that corresponds to the waking up signal generated by triggering the key and that is obtained on the touchscreen includes an operation touch area on an interface generated by triggering the key.

Implementation of the embodiments of the disclosure has the following beneficial effects:

In the embodiments of the disclosure, when receiving a signal for waking up a touchscreen, a terminal obtains, on the touchscreen, an effective touch area that corresponds to the signal for waking up the touchscreen according to a preset correspondence between the signal for waking up the touchscreen and the effective touch area; detects position information of a touch point within the effective touch area; and generates an operation instruction according to the position information of the touch point, so that the terminal can accurately obtain a touch point in a preset touch area, thereby improving accuracy during an operation of the terminal, reducing screen freezing phenomena when the terminal is being woken up, and improving user experience.

BRIEF DESCRIPTION OF DRAWINGS

To describe the technical solutions in the embodiments of the disclosure or in the prior art more clearly, the following briefly describes the accompanying drawings for describing the embodiments. The accompanying drawings in the following description show merely some embodiments of the disclosure, and a person of ordinary skill in the art may still derive other drawings from these accompanying drawings without creative efforts.

DESCRIPTION OF EMBODIMENTS

The following clearly and completely describes the technical solutions in the embodiments of the disclosure with reference to the accompanying drawings in the embodiments of the disclosure. The described embodiments are merely some but not all of the embodiments of the disclosure. All other embodiments obtained by a person of ordinary skill in the art based on the embodiments of the disclosure without creative efforts shall fall within the protection scope of the disclosure.

The embodiments of the disclosure may be executed by a terminal, and the terminal may include a mobile phone, a tablet computer, a palmtop computer, a mobile Internet device (MID), or the like. The foregoing terminals are merely examples and are not exhaustive, and the terminal includes but is not limited to the foregoing terminals.

S100: When a signal for waking up a touchscreen is received, obtain, on the touchscreen, an effective touch area that corresponds to the signal for waking up the touchscreen according to a preset correspondence between the signal for waking up the touchscreen and the effective touch area.

In this embodiment of the disclosure, when a terminal is in sleep mode, any operation for activating the terminal may be considered as an operation for waking up a touchscreen of the terminal. The operation for activating the terminal may include dialing the terminal, sending a short message service message to the terminal, and triggering a key on the terminal by a user. When the operation for activating the terminal is performed, the terminal may be activated, and the touchscreen of the terminal is lit and awakened. That is, when the terminal is activated, the terminal receives a signal for waking up the touchscreen, and when the terminal receives the signal for waking up the touchscreen when the terminal in standby mode or sleep mode, the touchscreen of the terminal may be awakened. The signal for waking up the touchscreen may include a call waking up signal for dialing the terminal, a short message service message waking up signal for sending a short message service message to the terminal, a waking up signal generated by triggering a key by a terminal user, and the like. In addition, the signal for waking up the touchscreen may include one or more signals, and this is not limited in this embodiment.

Figure 1:
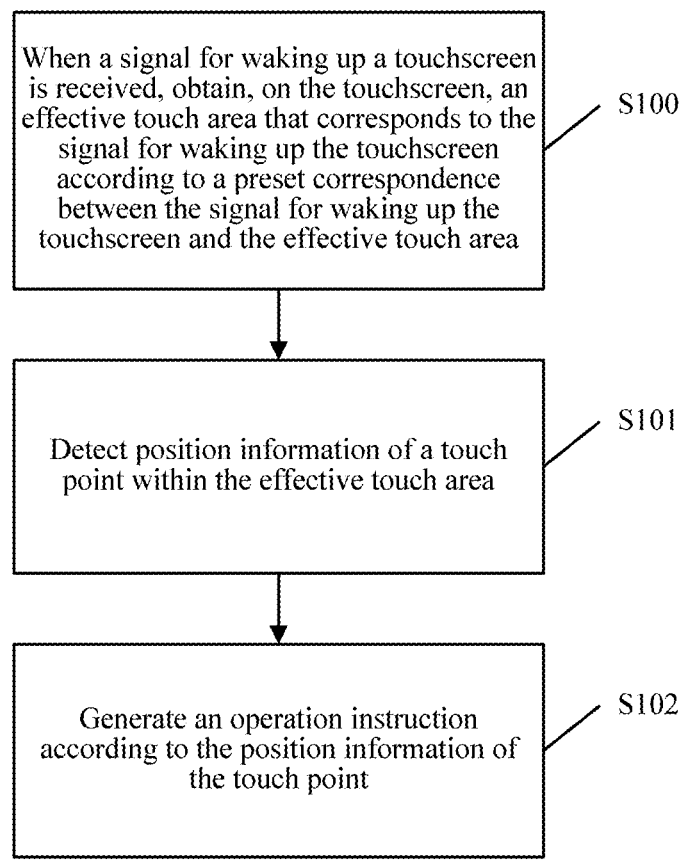
FIG. 1 is a schematic flowchart of a first embodiment of a touchscreen input method according to the disclosure.
Figure 2:
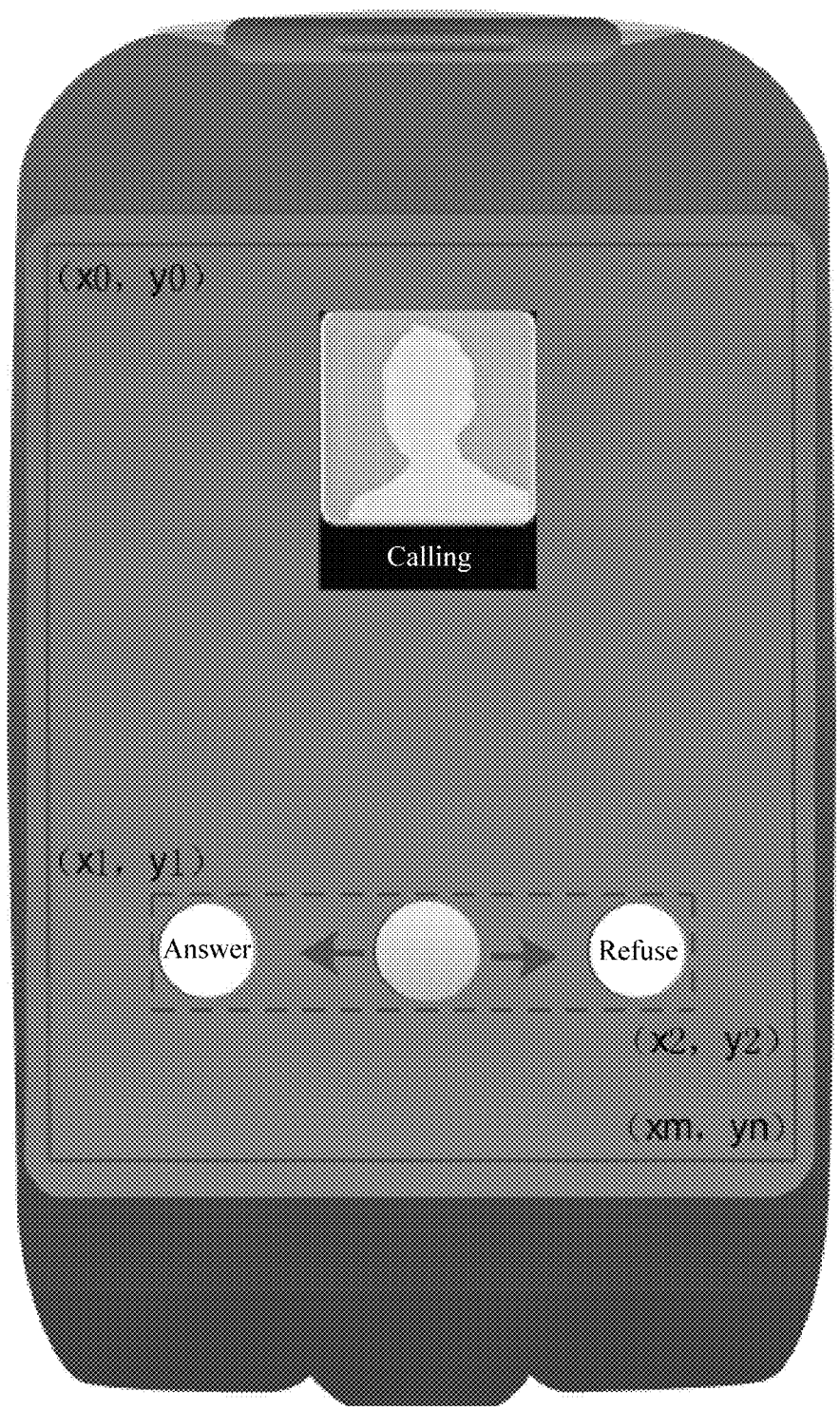
FIG. 2 is a schematic diagram of a preset effective touch area according to an embodiment of the disclosure.
Figure 3:
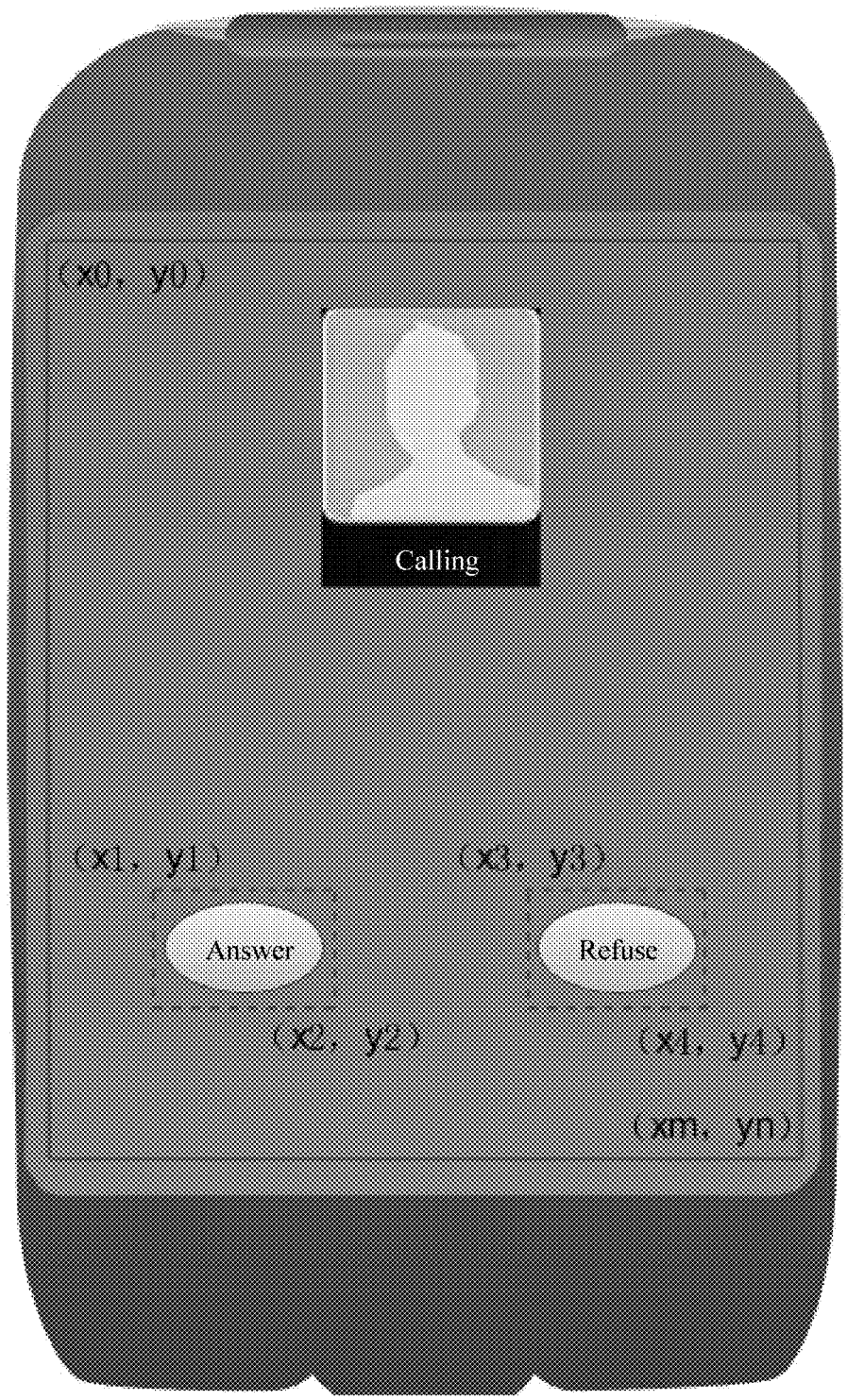
FIG. 3 is a schematic diagram of another preset effective touch area according to an embodiment of the disclosure.

In this embodiment of the disclosure, the terminal may preset an effective touch area. The presetting, by the terminal, an effective touch area may be presetting, by the terminal, a specified area on the touchscreen as the effective touch area. The preset effective touch area may include at least one specified area, and the specified area may be an area formed by coordinates. For example, as shown in FIG. 2, an area formed by coordinates (x1, y1) and coordinates (x2, y2) may be a preset effective touch area, or as shown in FIG. 3, an area formed by coordinates (x1, y1) and coordinates (x2, y2) and an area formed by coordinates (x3, y3) and coordinates (x4, y4) may be preset effective touch areas. When the terminal receives the signal for waking up the touchscreen, the terminal obtains the preset specified area.

Further, in this embodiment of the disclosure, the terminal may preset a correspondence between a signal for waking up the touchscreen and an effective touch area. For example, the terminal may preset a correspondence between a call waking up signal and a first effective touch area, a correspondence between a short message service message waking up signal and a second effective touch area, and a correspondence between a waking up signal generated by triggering a key and a third effective touch area. The first effective touch area, the second effective touch area, and the third effective touch area may be specified areas on the touchscreen, and the specified area may be any specified area on the touchscreen. Further, the specified area may further be an operation touch area, and the operation touch area may be operated by a user to generate an operation instruction. When the specified area is an operation touch area, the first effective touch area may be an operation touch area on a call interface, and a user may operate the operation touch area to generate an area of a call refusing instruction or a call connecting instruction. For details, refer to FIG. 2, and an operation touch area on the call interface may be, for example, the area formed by the coordinates (x1, y1) and the coordinates (x2, y2) shown in FIG. 2. The second effective touch area may be an operation touch area on a short message service message interface, and a user may operate the operation touch area to generate an area of an instruction for not viewing a short message service message or an instruction for viewing a short message service message. The third effective touch area may be an operation touch area on an interface generated by triggering a key, and a user may operate the operation touch area to generate an operation instruction. Further, the terminal may further preset another correspondence between a signal for waking up the touchscreen and an effective touch area, and this is not described in detail in this embodiment.

When receiving a signal for waking up the touchscreen, the terminal obtains, on the touchscreen, the effective touch area that corresponds to the signal for waking up the touchscreen according to the preset correspondence between the signal for waking up the touchscreen and the effective touch area. For example, when the signal for waking up the touchscreen is the call waking up signal, the effective touch area that may be obtained by the terminal on the touchscreen according to the preset correspondence between the signal for waking up the touchscreen and the effective touch area that corresponds to the call waking up signal may be an operation touch area on the call interface. When the signal for waking up the touchscreen that is received by the terminal is the short message service message waking up signal, the effective touch area that may be obtained by the terminal on the touchscreen according to the preset correspondence between the signal for waking up the touchscreen and the effective touch area that corresponds to the short message service message waking up signal may be an operation touch area on the short message service message interface. When the signal for waking up the touchscreen that is received by the terminal is the waking up signal generated by triggering the key, the effective touch area that may be obtained by the terminal on the touchscreen according to the preset correspondence between the signal for waking up the touchscreen and the effective touch area that corresponds to the waking up signal generated by triggering the key may be an operation touch area on the interface generated by triggering the key. Further, the signal for waking up the touchscreen may further include multiple signals. For example, the terminal may receive a call waking up signal and a short message service message waking up signal simultaneously. When the signal for waking up the touchscreen that is received by the terminal includes multiple signals, the terminal may also obtain, on the touchscreen, multiple effective touch areas that correspond to the multiple signals included in the signal for waking up the touchscreen according to the preset correspondences between the signals for waking up the touchscreen and the effective touch areas.

In a specific application, the terminal may include a CTP module, a CTP thread, and a call user interface (UI) module. The CTP module may include a touchscreen component, the touchscreen component may include a sensor, a lens, a flexible printed circuit board (FPC board), and a touch integrated circuit (IC), and the touch IC is installed with software such as firmware. The CTP thread may be software running on the terminal, and the CTP thread belongs to bottom-layer software and may be a processing center of the terminal. For example, the CTP thread may be software in a central processing unit (CPU) of the terminal. The CTP thread may communicate and interact with the CTP module by using an Inter-integrated Circuit (IC) interface, for example, the CTP module may report collected data to the CTP thread by using the I$^2$C interface for processing. The call UI module belongs to upper-layer software and directly interacts with a terminal user. When the signal for waking up the touchscreen that is received by the terminal is the call waking up signal, the call UI module responsible for a call service may deliver a specified area to the CTP thread. For example, referring to FIG. 2, the call UI module delivers the area formed by the coordinates (x1, y1) and the coordinates (x2, y2) to the CTP thread, and the CTP thread considers the area as the effective touch area.

S101: Detect position information of a touch point within the effective touch area.

In this embodiment of the disclosure, the terminal may obtain the position information of the touch point on the touchscreen. The position information of the touch point may be position information of a contact between the touchscreen and the body of a terminal user interacting with the terminal or a contact between the touchscreen and an object used by the terminal user for interacting with the terminal. The position information of the touch point may include a position of the touch point, a shape of the touch point, an area of the touch point, an identity (ID) of a contact conductor, and the like. The position of the touch point may be coordinates. IDs of touch points generated by a same conductor from touching the touchscreen to moving away from the touchscreen are the same, and IDs of touch points generated by touching the touchscreen by different conductors are different, and IDs of touch points generated by touching the touchscreen discontinuously by a same conductor are different. The body of the user may be a finger, and the object for interaction may be a conductor such as a pen.

In this embodiment of the disclosure, the terminal may determine, according to the obtained position information of the touch point, whether the touch point is within the effective touch area. The terminal may determine, according to obtained coordinates of the touch point, whether the touch point is within the effective touch area. For example, as shown in FIG. 2, when the effective touch area is the area formed by the coordinates (x1, y1) and the coordinates (x2, y2) shown in FIG. 2, and the position information of the touch point is (x, y), the terminal may determine whether the coordinates (x, y) are within the effective touch area formed by the coordinates (x1, y1) and the coordinates (x2, y2). When the coordinates (x, y) are within the effective touch area formed by the coordinates (x1, y1) and the coordinates (x2, y2), the terminal may obtain the position information of the touch point. When the coordinates (x, y) are outside the effective touch area formed by the coordinates (x1, y1) and the coordinates (x2, y2), the terminal suppresses the position information of the touch point and performs no processing on the position information of the touch point. Further, the terminal may further determine, according to the obtained coordinates of the touch point, the shape of the touch point, the area of the touch point, and the ID of the contact conductor, whether the touch point is within the effective touch area. When determining that the touch point is within the effective touch area, the terminal may obtain the position information of the touch point. When determining that the touch point is outside the effective touch area, the terminal suppresses the position information of the touch point and performs no processing on the position information of the touch point, so that the terminal may suppress a touch point outside the effective touch area, avoid a screen exception caused by the touch point outside the effective touch area, and reduce a probability of a screen freezing phenomenon.

In a specific application, a resolution of the CTP module included in the terminal may be the same as a resolution of a liquid crystal display (LCD) of the terminal. For example, if a resolution of a full high-definition (FHD) LCD is 1080×1920, a resolution of the CTP module is also 1080×1920. When the terminal receives the call waking up signal, the UI module responsible for the call service delivers the effective touch area formed by the coordinates (x1, y1) and the coordinates (x2, y2) to the CTP thread. In this case, when a conductor such as a finger touches the CTP module, the CTP module obtains the position information of the touch point on the touchscreen and the CTP module reports the position information of the touch point to the CTP thread. The position information of the touch point may include a horizontal coordinate x, a vertical coordinate y, and a contact conductor ID. A range of the horizontal coordinate x may be from 0 to 1079, and a range of the vertical coordinate y may be from 0 to 1919. When the CTP thread receives the position information of the touch point that is reported by the CTP module, the CTP thread determines whether the position information of the touch point is within the effective touch area. That is, the CTP thread extracts the coordinates (x, y), and determines whether the coordinates (x, y) are within the effective touch area formed by the coordinates (x1, y1) and the coordinates (x2, y2). When the coordinates (x, y) are within the effective touch area formed by the coordinates (x1, y1) and the coordinates (x2, y2), the CTP thread determines that the position information of the touch point is within the effective touch area, and the CTP thread extracts the position information of the touch point for processing. For example, the CTP thread generates an operation instruction according to the position information of the touch point. When the coordinates (x, y) are outside the effective touch area formed by the coordinates (x1, y1) and the coordinates (x2, y2), the CTP thread determines that the position information of the touch point is outside the effective touch area, and the CTP thread suppresses the position information of the touch point and performs no processing on the position information of the touch point. That is, the CTP thread may determine that the position information of the touch point is invalid position information of the touch point, and does not belong to data that needs to be processed, and the CTP thread remains in a state that exists before the position information of the touch point is received. The method for suppressing the touch point in the invalid effective touch area is implemented in the CTP thread, and a CTP needs to provide all original touch information to the CTP thread.

Further, in a specific application, alternatively, as shown in FIG. 2, when the terminal receives the call waking up signal, the call UI module responsible for the call service may deliver the effective touch area formed by the (x1, y1) and (x2, y2) coordinates to the CTP thread, and after the CTP thread receives the effective touch area delivered by the call UI module, the CTP thread may directly deliver the effective touch area to the CTP module. When a conductor such as a finger touches the CTP module, the CTP module may obtain position information of a touch point on the touchscreen, and the CTP module may determine whether the position information of the touch point is within the effective touch area. For example, the CTP module extracts the coordinates (x, y) according to the obtained position information of the touch point, and determines whether the coordinates (x, y) are within the effective touch area formed by the coordinates (x1, y1) and the coordinates (x2, y2). When the coordinates (x, y) are within the effective touch area formed by the coordinates (x1, y1) and the coordinates (x2, y2), the CTP module determines that the position information of the touch point is within the effective touch area, and the CTP module reports the position information of the touch point to the CTP thread for processing, for example, the CTP thread generates an operation instruction according to the position information of the touch point. When the coordinates (x, y) are outside the effective touch area formed by the coordinates (x1, y1) and the coordinates (x2, y2), the CTP module determines that the position information of the touch point is outside the effective touch area and does not report the position information of the touch point to the CTP thread for processing. That is, the CTP module may determine that the position information of the touch point is invalid position information of the touch point, and does not belong to data that needs to be reported, thereby implementing the objective that the CTP module reports only a touch point in the effective touch area formed by the (x1, y1) and (x2, y2) coordinates, and suppresses all touch points generated in other areas.

S102: Generate an operation instruction according to the position information of the touch point.

In this embodiment of the disclosure, when a conductor moves away on the touchscreen, the terminal may generate an operation instruction according to a touch point within the effective touch area. For example, when the terminal receives the call waking up signal, the effective touch area is the area formed by the coordinates (x1, y1) and the coordinates (x2, y2) shown in FIG. 2. When a finger of a terminal user slides leftwards within the effective touch area, the terminal may generate a call refusing instruction according to a touch point within the effective touch area. When the finger of the terminal slides leftwards outside the effective touch area, the terminal suppresses a touch point of the terminal user and continues to wait for inputting of the terminal user. When a part of a sliding track is within the effective touch area, and another part of the sliding track is outside the effective touch area when the finger of the terminal user slides leftwards, the terminal obtains the track within the effective touch area, and generates an operation instruction according to the track.

In this embodiment of the disclosure, after generating the operation instruction, the terminal may execute the operation instruction. For example, as shown in FIG. 2, the area formed by the coordinates (x1, y1) and the coordinates (x2, y2) is the effective touch area, and when a finger of a terminal user slides leftwards within the effective touch area, the terminal may generate a call refusing instruction according to a touch point within the effective touch area, and the terminal executes the generated call refusing instruction to refuse to answer a call.

Further, after executing the operation instruction, the terminal may determine the effective touch area as a whole area of the touchscreen, and in this case, the terminal does not suppress a contact point between a conductor and any area on the screen. In a specific application, for example, when a call is answered or refused on the terminal, the call UI module responsible for the call service may deliver an area formed by coordinates (x0, y0) and coordinates (xm, yn) to the CTP thread of the touchscreen. As shown in FIG. 2, the coordinates (x0, y0) and the coordinates (xm, yn) form a whole area, so that the CTP thread may report touch points on the whole screen to a subsequent UI interface.

In this embodiment of the disclosure, when receiving a signal for waking up a touchscreen, a terminal obtains, on the touchscreen, an effective touch area that corresponds to the signal for waking up the touchscreen according to a preset correspondence between the signal for waking up the touchscreen and the effective touch area; detects position information of a touch point within the effective touch area; and generates an operation instruction according to the position information of the touch point, so that the terminal can accurately obtain a touch point in a preset touch area, thereby improving accuracy during an operation of the terminal, reducing screen freezing phenomena when the terminal is being woken up, and improving user experience.

To facilitate better implementation of the foregoing solutions of the embodiments of the disclosure, the following further provides related apparatuses configured to cooperatively implement the foregoing solutions.

Figure 4:
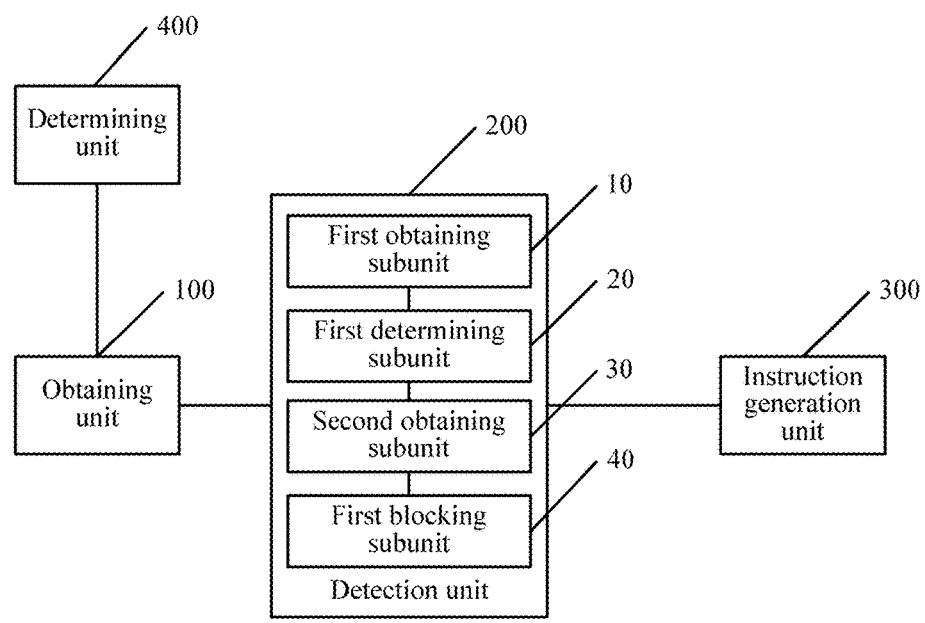
FIG. 4 is a schematic flowchart of a first embodiment of a terminal according to an embodiment of the disclosure.

Referring to FIG. 4, FIG. 4 shows a terminal according to an embodiment of the disclosure. As shown in FIG. 4, the terminal according to this embodiment may include an obtaining unit 100 configured to, when a signal for waking up a touchscreen is received, obtain on the touchscreen an effective touch area that corresponds to the signal for waking up the touchscreen according to a preset correspondence between the signal for waking up the touchscreen and the effective touch area; a detection unit 200 configured to detect position information of a touch point within the effective touch area; and an instruction generation unit 300 configured to generate an operation instruction according to the position information of the touch point.

The detection unit 200 includes a first obtaining subunit 10 configured to obtain position information of a touch point on the touchscreen; a first determining subunit 20 configured to determine whether the position information of the touch point is within the effective touch area; a second obtaining subunit 30 configured to, when the first determining subunit determines that the position information of the touch point is within the effective touch area, obtain the position information of the touch point; and a first blocking subunit 40 configured to, when the first determining subunit determines that the position information of the touch point is outside the effective touch area, suppress the position information of the touch point.

The detection unit 200 is further configured to obtain position information of a touch point on the touchscreen by using a capacitive touch panel CTP module; report the position information of the touch point to a CTP thread by using the CTP module; determine, by using the CTP thread, whether the position information of the touch point is within the effective touch area; and when it is determined that the position information of the touch point is within the effective touch area, obtain, by using the CTP thread, the position information of the touch point for processing; or when it is determined that the position information of the touch point is outside the effective touch area, suppress the position information of the touch point.

The detection unit 200 is further configured to obtain position information of a touch point on the touchscreen by using a CTP module; determine, by using the CTP module, whether the position information of the touch point is within the effective touch area; and when it is determined, by using the CTP module, that the position information of the touch point is within the effective touch area, report, by using the CTP module, the position information of the touch point to the CTP thread for processing; or when it is determined, by using the CTP module, that the position information of the touch point is outside the effective touch area, skip reporting the position information of the touch point to the CTP thread for processing.

The signal for waking up the touchscreen includes any one or more of a call waking up signal, a short message service message waking up signal, or a waking up signal generated by triggering a key.

The obtaining unit 100 is configured to, when the received signal for waking up the touchscreen includes the call waking up signal, obtain the effective touch area that corresponds to the call waking up signal that is obtained on the touchscreen. The touchscreen includes an operation touch area on a call interface.

The obtaining unit 100 is configured to, when the received signal for waking up the touchscreen includes the short message service message waking up signal, obtain the effective touch area that corresponds to the short message service message waking up signal that is obtained on the touchscreen. The effective touch area includes an operation touch area on a short message service message interface.

The obtaining unit 100 is configured to, when the received signal for waking up the touchscreen includes the waking up signal generated by triggering a key, the effective touch area that corresponds to the waking up signal generated by triggering the key is obtained on the touchscreen. The effective touch area includes an operation touch area on an interface generated by triggering the key.

It may be understood that, functions of functional modules of the apparatus of this embodiment may be implemented according to the methods in the foregoing method embodiments; for specific implementation processes, reference may be made to related descriptions for the foregoing method embodiments, and details are not described herein again.

In this embodiment of the disclosure, when receiving a signal for waking up a touchscreen, a terminal obtains, on the touchscreen, an effective touch area that corresponds to the signal for waking up the touchscreen according to a preset correspondence between the signal for waking up the touchscreen and the effective touch area; detects position information of a touch point within the effective touch area; and generates an operation instruction according to the position information of the touch point, so that the terminal can accurately obtain a touch point in a preset touch area, thereby improving accuracy during an operation of the terminal, reducing screen freezing phenomena when the terminal is being woken up, and improving user experience.

Figure 5:
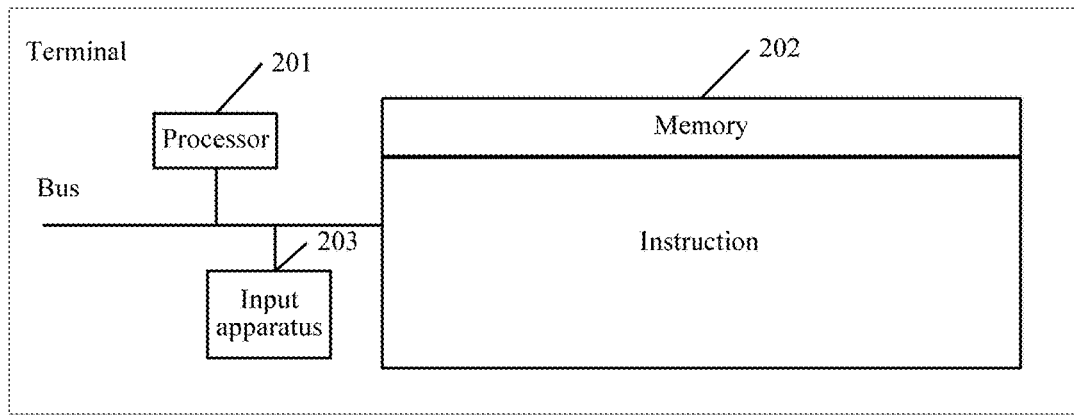
FIG. 5 is a schematic flowchart of a first embodiment of a terminal according to an embodiment of the disclosure.

Referring to FIG. 5, FIG. 5 is a schematic structural diagram of a terminal according to an embodiment of the disclosure. As shown in FIG. 5, the terminal according to this embodiment may include a processor 201 (there may be one or more processors 201 in the terminal, and in FIG. 5, one processor is used as an example), a memory 202, and an input apparatus 203. In this embodiment of the disclosure, the processor 201, the memory 202, and the input apparatus 203 may be connected by using a bus or in another manner, and in FIG. 5, an example in which connection is implemented by using a bus is used.

The processor 201 performs the following steps: when the input apparatus 203 receives a signal for waking up a touchscreen, obtaining, on the touchscreen, an effective touch area that corresponds to the signal for waking up the touchscreen according to a preset correspondence between the signal for waking up the touchscreen and the effective touch area; detecting position information of a touch point within the effective touch area; and generating an operation instruction according to the position information of the touch point.

Detecting, by the processor 201, the position information of a touch point within the effective touch area includes obtaining position information of a touch point on the touchscreen; determining whether the position information of the touch point is within the effective touch area; and when the position information of the touch point is within the effective touch area, obtaining the position information of the touch point; or when the position information of the touch point is outside the effective touch area, suppressing the position information of the touch point.

Detecting, by the processor 201, the position information of a touch point within the effective touch area includes obtaining position information of a touch point on the touchscreen by using a CTP module; reporting the position information of the touch point to a CTP thread by using the CTP module; determining, by using the CTP thread, whether the position information of the touch point is within the effective touch area; and when it is determined, by using the CTP thread, that the position information of the touch point is within the effective touch area, obtaining, by using the CTP thread, the position information of the touch point for processing; or when it is determined, by using the CTP thread, that the position information of the touch point is outside the effective touch area, performing no processing on the position information of the touch point by using the CTP thread.

Detecting, by the processor 201, the position information of a touch point within the effective touch area includes obtaining position information of a touch point on the touchscreen by using the CTP module; determining, by using the CTP module, whether the position information of the touch point is within the effective touch area; and when it is determined, by using the CTP module, that the position information of the touch point is within the effective touch area, reporting, by using the CTP module, the position information of the touch point to the CTP thread for processing; or when it is determined, by using the CTP module, that the position information of the touch point is outside the effective touch area, skipping reporting the position information of the touch point to the CTP thread for processing.

The signal for waking up the touchscreen includes any one or more of a call waking up signal, a short message service message waking up signal, or a waking up signal generated by triggering a key.

The processor 201 is configured to, when the input apparatus 203 receives a signal for waking up a touchscreen, obtain, on the touchscreen, an effective touch area that corresponds to the signal for waking up the touchscreen according to a preset correspondence between the signal for waking up the touchscreen and the effective touch area.

When the received signal for waking up the touchscreen includes the call waking up signal, the effective touch area that corresponds to the call waking up signal that is obtained on the touchscreen includes an operation touch area on a call interface.

The processor 201 is configured to, when the input apparatus 203 receives a signal for waking up a touchscreen, obtain, on the touchscreen, an effective touch area that corresponds to the signal for waking up the touchscreen according to a preset correspondence between the signal for waking up the touchscreen and the effective touch area. When the received signal for waking up the touchscreen includes the short message service message waking up signal, the effective touch area that corresponds to the short message service message waking up signal that is obtained on the touchscreen includes an operation touch area on a short message service message interface.

The processor 201 is configured to, when the input apparatus 203 receives a signal for waking up a touchscreen, obtain, on the touchscreen, an effective touch area that corresponds to the signal for waking up the touchscreen according to a preset correspondence between the signal for waking up the touchscreen and the effective touch area. When the received signal for waking up the touchscreen includes the waking up signal generated by triggering a key, the effective touch area that corresponds to the waking up signal generated by triggering the key that is obtained on the touchscreen includes an operation touch area on an interface generated by triggering the key.

It may be understood that, functions of functional modules of the terminal of this embodiment may be implemented according to the methods in the foregoing method embodiments; for specific implementation processes, reference may be made to related descriptions for the foregoing method embodiments, and details are not described herein again.

In this embodiment of the disclosure, when receiving a signal for waking up a touchscreen, a terminal obtains, on the touchscreen, an effective touch area that corresponds to the signal for waking up the touchscreen according to a preset correspondence between the signal for waking up the touchscreen and the effective touch area; detects position information of a touch point within the effective touch area; and generates an operation instruction according to the position information of the touch point, so that the terminal can accurately obtain a touch point in a preset touch area, thereby improving accuracy during an operation of the terminal, reducing screen freezing phenomena when the terminal is being woken up, and improving user experience.

It should be noted that, for ease of description, the foregoing method embodiments are described as a series of actions. However, a person skilled in the art should understand that the disclosure is not limited to the described action sequence, because some steps may be performed in other sequences or performed simultaneously according to the disclosure. In addition, a person skilled in the art should also understand that all the embodiments described in the specification are example embodiments, and the related actions and modules are not mandatory to the disclosure.

In the foregoing embodiments, the description of each embodiment has respective focuses. For a part that is not described in detail in an embodiment, refer to related descriptions in other embodiments.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include a magnetic disk, an optical disc, a Read-Only Memory (ROM), or a Random Access Memory (RAM).

What is disclosed above is merely example embodiments of the disclosure, and certainly is not intended to limit the protection scope of the disclosure. Therefore, equivalent variations made in accordance with the claims of the disclosure shall fall within the scope of the disclosure.

What is claimed is:

1. A terminal, comprising:
   an input apparatus comprising a touchscreen;
   a memory coupled to the input apparatus, the memory comprising instructions; and
   a processor coupled to the memory and the input apparatus, the instructions causing the processor to be configured to:
   detect that a waking up signal to wake up the touchscreen is received, the waking up signal comprising a call signal, a short message service message signal, or a triggering signal generated by triggering a key;
   define, on the touchscreen after receiving the waking up signal, an effective touch area when the waking up signal corresponds to a signal on the terminal for waking up the touchscreen, the effective touch area comprising a size of a touch area and a location of the touch area on the touchscreen, and the terminal storing a preset correspondence between each waking up signal received by the terminal and each effective touch area on the touchscreen;
   detect position information of a touch point within the effective touch area; and
   generate an operation instruction according to the position information of the touch point.

2. The terminal of claim 1, wherein the instructions further cause the processor to be configured to:
   obtain the position information of the touch point on the touchscreen;
   determine whether the position information of the touch point is within the effective touch area;
   obtain the position information of the touch point when the position information of the touch point is within the effective touch area; and
   suppress the position information of the touch point when the position information of the touch point is outside the effective touch area.

3. The terminal of claim 2, wherein the instructions further cause the processor to be configured to:
   obtain the position information of the touch point on the touchscreen by using a capacitive touch panel (CTP) module;
   report the position information of the touch point to a CTP thread by using the CTP module;
   determine, by using the CTP thread, whether the position information of the touch point is within the effective touch area;
   obtain, by using the CTP thread, the position information of the touch point for processing when the position information of the touch point is within the effective touch area; and
   ignore the position information of the touch point by using the CTP thread when the position information of the touch point is outside the effective touch area.

4. The terminal of claim 2, wherein the instructions further cause the processor to be configured to:

obtain, using a capacitive touch panel (CTP) module, the position information of the touch point on the touchscreen;

determine, using the CTP module, whether the position information of the touch point is within the effective touch area;

report, using the CTP module, the position information of the touch point to the CTP thread for processing when the position information of the touch point is within the effective touch area; and skip reporting the position information of the touch point to the CTP thread for processing when the position information of the touch point is outside the effective touch area.

5. The terminal of claim 2, wherein the effective touch area that corresponds to the call signal comprises an operation touch area on a call interface.

6. The terminal of claim 2, wherein the effective touch area that corresponds to the short message service message signal comprises an operation touch area on a short message service message interface.

7. The terminal of claim 2, wherein the effective touch area that corresponds to the triggering signal generated by triggering the key comprises an operation touch area on an interface generated by triggering the key.

8. A terminal, comprising:
a touchscreen;
a memory coupled to the touchscreen, the memory comprising instructions; and
a processor coupled to the memory and the touchscreen, the instructions causing the processor to be configured to:
detect that a waking up signal to wake up the touchscreen is received, the waking up signal comprising a call signal, a short message service message signal, or a triggering signal generated by triggering a key;
define, on the touchscreen after receiving the waking up signal, an effective touch area when the waking up signal corresponds to a signal on the terminal for waking up the touchscreen, the effective touch area comprising a size of a touch area and a location of the touch area on the touchscreen, and the terminal storing a preset correspondence between each waking up signal received by the terminal and each effective touch area on the touchscreen;
detect position information of a touch point within the effective touch area; and
generate an operation instruction according to the position information of the touch point.

9. The terminal of claim 8, wherein the instructions further cause the processor to be configured to:
obtain position information of the touch point on the touchscreen;
determine whether the position information of the touch point is within the effective touch area;
obtain the position information of the touch point when the position information of the touch point is within the effective touch area; and
suppress the position information of the touch point when the position information of the touch point is outside the effective touch area.

10. The terminal of claim 9, wherein the instructions further cause the processor to be configured to:
obtain position information of the touch point on the touchscreen by using a capacitive touch panel (CTP) module;

report the position information of the touch point to a CTP thread by using the CTP module;
determine, using the CTP thread, whether the position information of the touch point is within the effective touch area;
obtain, using the CTP thread, the position information of the touch point for processing when the position information of the touch point is within the effective touch area; and
suppress the position information of the touch point when the position information of the touch point is outside the effective touch area.

11. The terminal of claim 9, wherein the instructions further cause the processor to be configured to:
obtain position information of the touch point on the touchscreen by using a capacitive touch panel (CTP) module;
determine, using the CTP module, whether the position information of the touch point is within the effective touch area;
report, using the CTP module, the position information of the touch point to a CTP thread for processing when the position information of the touch point is within the effective touch area; and
skip reporting the position information of the touch point to the CTP thread for processing when the position information of the touch point is outside the effective touch area.

12. The terminal of claim 8, wherein the effective touch area that corresponds to the call signal comprises an operation touch area on a call interface when the waking up signal comprises the call signal.

13. The terminal of claim 8, wherein the effective touch area that corresponds to the short message service message signal comprises an operation touch area on a short message service message interface when the waking up signal comprises the short message service message signal.

14. The terminal of claim 8, wherein the effective touch area that corresponds to the triggering signal generated by triggering the key comprises an operation touch area on an interface generated by triggering the key when the waking up signal comprises the triggering signal generated by triggering the key.

15. A touchscreen input method for a terminal comprising a touchscreen, the method comprising:
receiving, by the terminal, a waking up signal for waking up the touchscreen, the waking up signal comprising a call signal, a short message service message signal, or a triggering signal generated by triggering a key;
defining, by the terminal after receiving the waking up signal, an effective touch area on the touchscreen when the waking up signal corresponds to a signal on the terminal for waking up the touchscreen, the effective touch area comprising a size of a touch area and a location of the touch area on the touchscreen, and the terminal storing a preset correspondence between each waking up signal received by the terminal and each effective touch area on the touchscreen;
detecting position information of a touch point within the effective touch area; and
generating an operation instruction according to the position information of the touch point.

16. The method of claim 15, wherein detecting the position information of the touch point within the effective touch area comprises:
obtaining position information of the touch point on the touchscreen;

determining whether the position information of the touch point is within the effective touch area;

obtaining the position information of the touch point when the position information of the touch point is within the effective touch area; and suppressing the position information of the touch point when the position information of the touch point is outside the effective touch area.

17. The method of claim 16, wherein detecting the position information of the touch point within the effective touch area comprises:

obtaining position information of the touch point on the touchscreen by using a capacitive touch panel (CTP) module;

reporting the position information of the touch point to a CTP thread by using the CTP module;

determining, by using the CTP thread, whether the position information of the touch point is within the effective touch area;

obtaining, by using the CTP thread, the position information of the touch point for processing when the position information of the touch point is within the effective touch area; and performing no processing on the position information of the touch point by using the CTP thread when the position information of the touch point is outside the effective touch area.

18. The method of claim 16, wherein detecting the position information of the touch point within the effective touch area comprises:

obtaining position information of the touch point on the touchscreen by using a capacitive touch panel (CTP) module;

determining, by using the CTP module, whether the position information of the touch point is within the effective touch area;

reporting, by using the CTP module, the position information of the touch point to a CTP thread for processing when the position information of the touch point is within the effective touch area; and skipping the reporting of the position information of the touch point to the CTP thread for processing.

19. The method of claim 15, wherein defining, on the touchscreen, the effective touch area according to the preset correspondence between each of the waking up signals and each of the effective touch areas comprises defining an operation touch area on a call interface when a first waking up signal comprises the call signal.

20. The method of claim 15, wherein defining, on the touchscreen, the effective touch area according to the preset correspondence between each of the waking up signals and each of the effective touch areas comprises defining an operation touch area on a short message service message interface when a first waking up signal comprises the short message service message signal.

21. The method of claim 15, wherein defining, on the touchscreen, the effective touch area according to the preset correspondence between each of the waking up signals and each of the effective touch areas comprises defining an operation touch area on an interface generated by triggering the key when the waking up signal comprises the triggering signal generated by triggering the key.

22. A non-transitory computer readable medium including at least one computer program code stored therein for a touchscreen input on a touchscreen associated with a computing device wherein when executed on a processor, the non-transitory computer readable medium causes the processor to:

detect that a waking up signal to wake up the touchscreen is received, the waking up signal comprising a call signal, a short message service message signal, or a triggering signal generated by triggering a key;

define, on the touchscreen after receiving the waking up signal, an effective touch area when the waking up signal corresponds to a signal on the terminal for waking up the touchscreen, the effective touch area comprising a size of a touch area and a location of the touch area on the touchscreen, and the computing device storing a preset correspondence between each waking up signal received by the computing device and each effective touch area on the touchscreen;

detect position information of a touch point within the effective touch area; and generate an operation instruction according to the position information of the touch point.

* * * * *